US009802159B2

(12) United States Patent
Rekow et al.

(10) Patent No.: US 9,802,159 B2
(45) Date of Patent: Oct. 31, 2017

(54) AIR SEPARATION MODULE CANISTER

(71) Applicant: Hamilton Sundstrand Corporation, Windsor Locks, CT (US)

(72) Inventors: Corey E. Rekow, West Hartford, CT (US); John E. Horr, Jr., North Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 264 days.

(21) Appl. No.: 14/795,474

(22) Filed: Jul. 9, 2015

(65) Prior Publication Data
US 2017/0007966 A1  Jan. 12, 2017

(51) Int. Cl.
*B01D 53/22* (2006.01)
*B01D 63/04* (2006.01)
*B01D 63/02* (2006.01)
*B64D 37/32* (2006.01)

(52) U.S. Cl.
CPC ............ *B01D 63/04* (2013.01); *B01D 53/22* (2013.01); *B01D 63/02* (2013.01); *B01D 63/021* (2013.01); *B64D 37/32* (2013.01); *B01D 2313/04* (2013.01); *B01D 2313/20* (2013.01); *B01D 2313/50* (2013.01); *B01D 2313/90* (2013.01); *B01D 2319/04* (2013.01)

(58) Field of Classification Search
CPC ............ B01D 2313/04; B01D 2313/50; B01D 2313/20; B01D 53/22; B01D 2319/04; B01D 63/04; B01D 63/02; B01D 2313/90; B01D 63/021; B64D 37/32
See application file for complete search history.

(56) References Cited

U.S. PATENT DOCUMENTS

| 4,789,388 | A | * | 12/1988 | Nishibata | ............... | B01D 53/22 96/381 |
| 5,282,966 | A |   | 2/1994  | Walker    |                |                   |
| 5,294,345 | A |   | 3/1994  | Kaschemekat |              |                   |
| 5,454,845 | A | * | 10/1995 | Anahara   | ............... | B01D 39/14 55/482.1 |
| 5,636,619 | A | * | 6/1997  | Poola     | ..................... | B01D 53/22 123/585 |
| 5,649,517 | A | * | 7/1997  | Poola     | ..................... | B01J 19/088 123/585 |

(Continued)

FOREIGN PATENT DOCUMENTS

| CA | 2325299 A1   | 5/2001 |
| CN | 201840970 U  | 5/2011 |

(Continued)

OTHER PUBLICATIONS

Extended European Search Report for EP Application No. 16178798.1, dated Dec. 19, 2016, 9 pages.

*Primary Examiner* — Anthony Shumate
(74) *Attorney, Agent, or Firm* — Kinney & Lange, P.A.

(57) ABSTRACT

An air separation module includes a housing, an air separation element, and an insulating element. The housing has an inlet and two outlets. The air separation element is enclosed within the housing and extends along a length of the housing. The insulating element is positioned inward of an outer perimeter of the housing and substantially surrounds an outer perimeter of the air separation element along a length of the air separation element.

20 Claims, 4 Drawing Sheets

(56) References Cited

U.S. PATENT DOCUMENTS

| | | | |
|---|---|---|---|
| 5,828,655 A * | 10/1998 | Moura | H04B 7/18523 |
| | | | 348/E5.008 |
| 5,879,615 A * | 3/1999 | Syme | B05B 7/0861 |
| | | | 264/112 |
| 6,491,739 B1 | 12/2002 | Crome et al. | |
| 8,110,027 B2 | 2/2012 | Beeson | |
| 2001/0037972 A1 * | 11/2001 | Quick | B01D 39/2044 |
| | | | 210/491 |
| 2003/0201223 A1 * | 10/2003 | Cheng | D01F 6/32 |
| | | | 210/500.23 |
| 2004/0132371 A1 * | 7/2004 | Naber | C03B 37/01 |
| | | | 442/327 |
| 2006/0062707 A1 | 3/2006 | Crome et al. | |
| 2008/0168901 A1 | 7/2008 | Carolan et al. | |
| 2010/0160709 A1 * | 6/2010 | Grierson | B01J 3/02 |
| | | | 588/312 |
| 2010/0188833 A1 * | 7/2010 | Liang | H01B 1/04 |
| | | | 361/818 |
| 2012/0260422 A1 * | 10/2012 | Rock | A41D 31/0038 |
| | | | 5/483 |
| 2014/0013951 A1 * | 1/2014 | Schaeffer | B01D 53/227 |
| | | | 96/7 |
| 2015/0000523 A1 * | 1/2015 | Jojic | B01D 53/228 |
| | | | 95/54 |
| 2016/0332109 A1 * | 11/2016 | Milli | B01D 53/22 |

FOREIGN PATENT DOCUMENTS

| | | |
|---|---|---|
| EP | 0875285 A1 | 11/1998 |
| JP | 2003065566 A | 3/2003 |
| WO | WO90/09224 A1 | 8/1990 |

* cited by examiner

AIR SEPARATION MODULE CANISTER

BACKGROUND

The present invention relates to fuel tank inerting systems, and more particularly to an air separation module of a fuel tank inerting system.

Fuel tank inerting systems are used to reduce the risk of fire or fuel tank explosions. Fuel tank inerting systems use air separation modules (ASMs) to separate oxygen from a fluid stream, such as ambient air, to generate an inert, nitrogen-enriched, stream of fluid that can be delivered to the fuel tanks to replace the air/fuel mixture that exists above the liquid fuel. The air separation process works more efficiently with increasing air temperature. An external insulating blanket can be used prevent or limit a loss of heat from the ASMs in low temperature environments. For example, on-board aircraft fuel tank inerting systems, generally referred to as On-Board Inert Gas Generating Systems (OBIGGS), may require the addition of an insulating blanket to prevent or limit heat loss at altitude where temperatures are low. External insulating blankets generally must be secured to the ASMs and/or other components of the fuel inerting system. The secured placement of external insulating blankets can impede regular maintenance and replacement of ASMs. Additionally, external insulating blankets can add cost to the system and are vulnerable to damage and deterioration from handling, weathering or leaking.

SUMMARY

In one aspect, an air separation module includes a housing, an air separation element, and an insulating element. The housing has an inlet and two outlets. The air separation element is enclosed within the housing and extends along a length of the housing. The insulating element is positioned inward of an outer perimeter of the housing and substantially surrounds an outer perimeter of the air separation element along a length of the air separation element.

In another aspect, an air separation module includes an air separation element, an insulating element, and a housing. The insulating element substantially surrounds an outer perimeter of the air separation element along a length of the air separation element. The housing has an inlet, a first outlet, and a second outlet, and encloses the combination of the insulating element and the air separation element.

In yet another aspect, a method of making an air separation module to improve efficiency of separation includes the steps of fabricating a housing for an air separation module, providing an insulating element extending substantially along a length of the housing and enclosed within an outer perimeter of the housing, and positioning an air separation element within the housing. The air separation element extends substantially along the length of the housing.

The present summary is provided only by way of example, and not limitation. Other aspects of the present disclosure will be appreciated in view of the entirety of the present disclosure, including the entire text, claims and accompanying figures.

Figure 1:
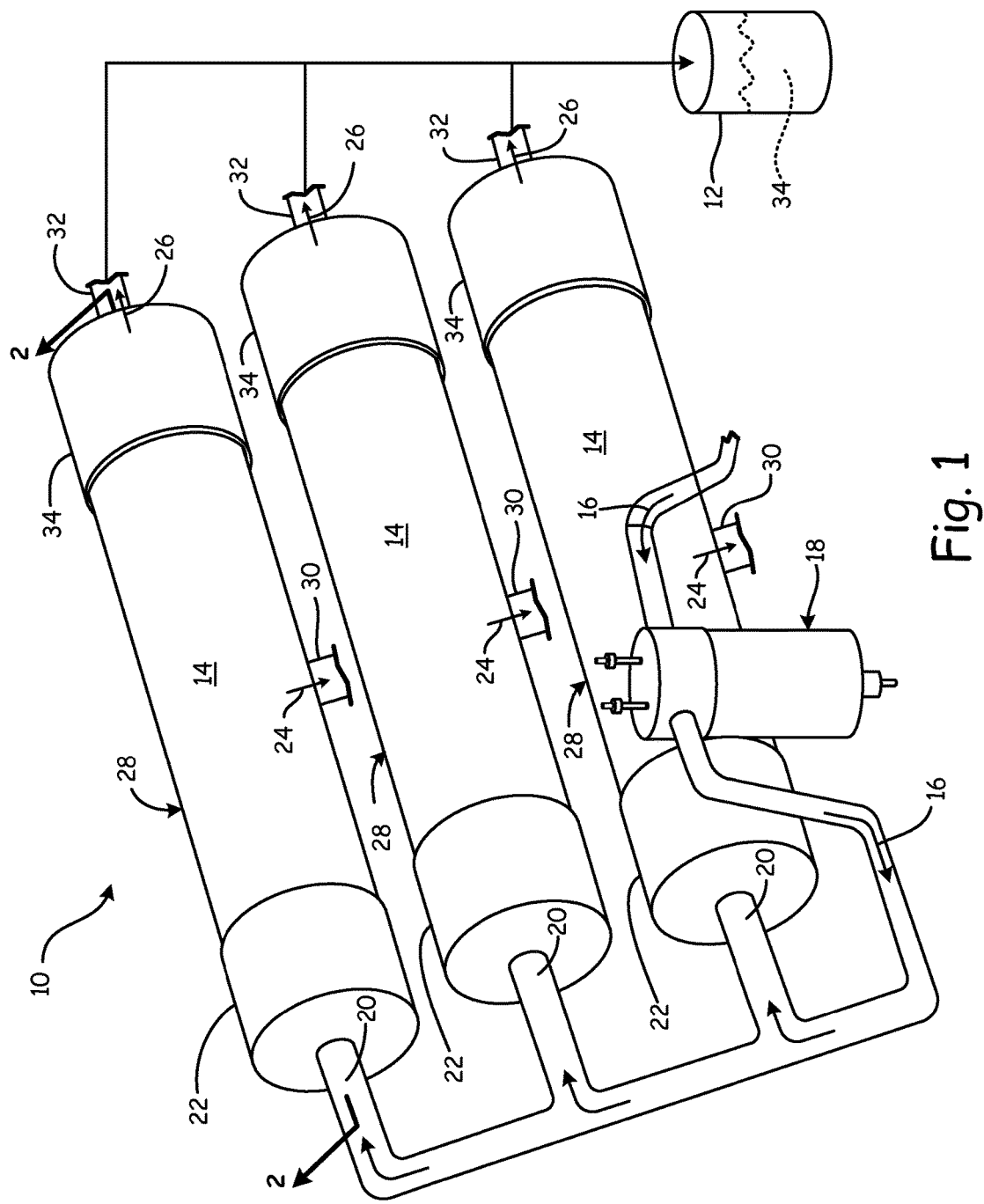
FIG. 1 is a perspective view of one embodiment of a fuel tank inerting system.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and/or components not specifically shown in the drawings.

DETAILED DESCRIPTION

To overcome challenges posed by an external insulating blanket, an ASM can be designed to limit heat loss from an air separation element housed within an ASM canister or housing. FIG. 1 is a perspective view of one embodiment of a fuel tank inerting system 10 for delivering nitrogen-enriched air to a fuel tank 12. Fuel tank inerting system 10 can include one or more ASMs 14 capable of removing oxygen-enriched fluid from an air stream 16. It will be understood by one skilled in the art that the number of ASMs can be varied depending on the application and size of fuel tank 12. Filter 18 can optionally be included upstream of ASM 14 to remove impurities or unwanted constituents of the air stream, such as particulate matter, oil, or ozone, among other constituents that may negatively impact the operation of ASM 14. Air stream 16, for instance, can be a turbine bleed air, which may include particulate matter and oil, as well as ozone if the bleed air is from an aircraft turbine engine part operating at altitude. Air stream 16 can enter ASM 14 through inlet 20 positioned on end cap 22. ASM 14 can remove oxygen from air stream 16, creating oxygen-enriched air stream 24 and nitrogen-enriched air stream 26. Oxygen-enriched air stream 24 can collect along a length of ASM housing 28 and can exit from ASM 14 at outlet 30. Nitrogen-enriched air stream 26 can flow through an air separation element (not shown) across the length of ASM 14 and exit at outlet 32 positioned on end cap 34. Nitrogen-enriched air stream 26 can then be delivered to fuel tank 12 to replace an air/fuel mixture that exists above a liquid fuel 34 in fuel tank 12.

Figure 2:
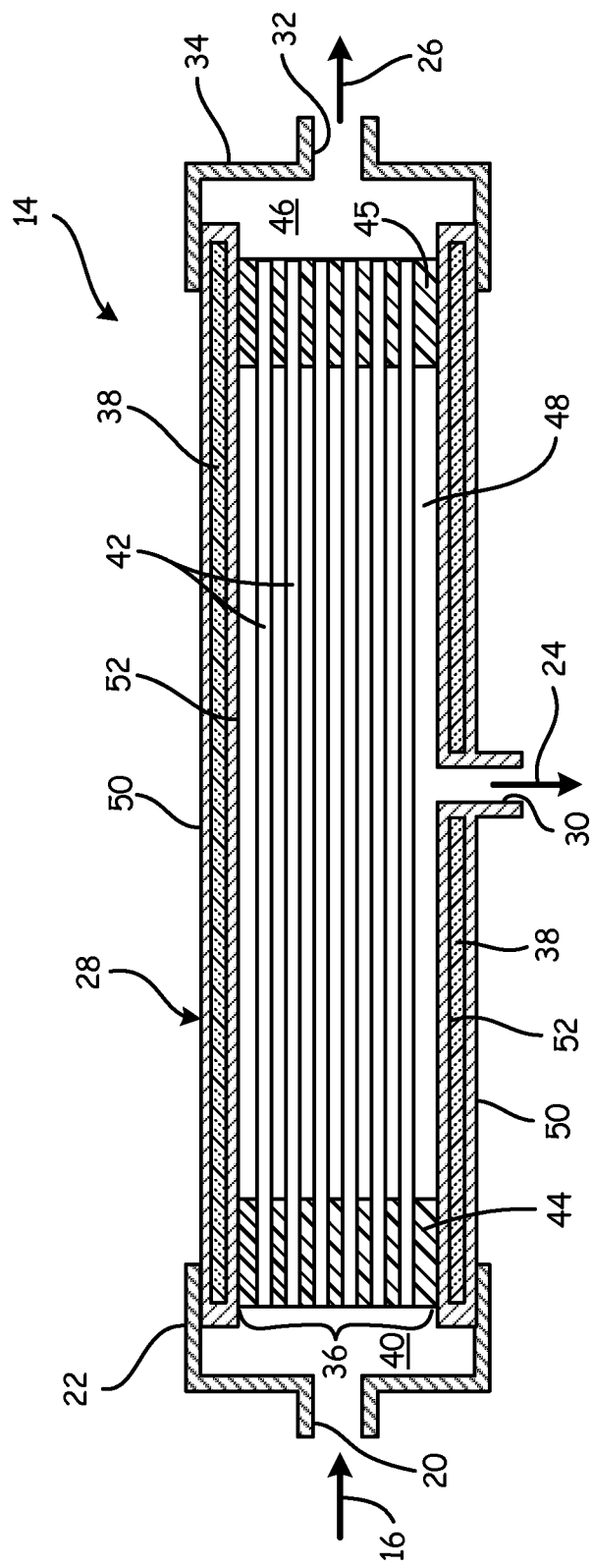
FIG. 2 is a lengthwise cross-sectional view of one embodiment of an air separation module taken along the 2-2 line of FIG. 1.

FIG. 2 is a lengthwise cross-sectional view of one embodiment of an air separation module taken along the 2-2 line of FIG. 1. ASM 14 can include housing 28 with closure end caps 22, 34, inlet 20, and outlets 30, 32; air separation element 36; and insulating element 38. End caps 22, 34 can be attached to housing 28 with a threaded fastener, adhesive, weld, or other suitable attachment mechanism. In one embodiment, one or both end caps 22, 34 can be detachable from housing 28 to allow removal and replacement of air separation element 36. In another embodiment, one end cap 22, 34 can be integrally formed with housing 28.

Air stream 16 can enter ASM 14 at inlet 20, which can open to cavity 40 adjacent an end of air separation element 36. Air separation element 36 can include an elongated bundle of hollow fibers 42 with semi-permeable membranes that allow passage of oxygen out of hollow fibers 42, as known in the art. Hollow fibers 42 can be held together by binder elements 44, 45 at each end. Binder elements 44, 45 can extend outward of an outer perimeter of air separation element 36. An outer perimeter of binder elements 44, 45 can form a seal against housing 28 to prevent air stream 16 from bypassing air separation element 36. In another embodiment, a seal (not shown), such as, but not limited to an O-ring, can be positioned between binder element 44, 45 and housing 28 to prevent air stream 16 from bypassing air separation element 36. Binder elements 44, 45 can be an epoxy or other binding material as known in the art. Hollow fibers 42 can open to cavity 40 at an inlet (20) end and to cavity 46 at an outlet (32) end. Although FIG. 2 shows hollow fibers 42 as straight hollow members extending from one end to the other and separated from each other, it will be understood by one skilled in the art, that hollow fibers 42 can be closely wound together forming curved flow paths. Air stream 16 can enter hollow fibers 42 from cavity 40. As air stream 16 passes through hollow fibers 42, oxygen can permeate through the fiber membranes, forming oxygen-enriched air stream 24. Oxygen-enriched air stream 24 can collect in collection chamber 48, which can surround an outer perimeter of air separation element 36 between binder elements 44, 45. From collection chamber 48, oxygen-enriched air stream 24 can exit ASM 14 through outlet 30. Because walls of hollow fibers 42 are less permeable to nitrogen than oxygen, nitrogen-enriched air stream 26 forms in hollow fibers 42. Nitrogen-enriched air stream 26 flows through hollow fibers 42 to cavity 46, from which nitrogen-enriched air stream 26 exits ASM 14 through outlet 32 and flows to fuel tank 12 (shown in FIG. 1).

The addition of heat can make the process of separating oxygen from air stream 16 more efficient. Heat can be provided by air stream 16. For instance, air stream 16 can be heated prior to entering ASM 14 or can be a turbine bleed air of sufficiently high temperature. Generally, the inlet air stream 16 will have a temperature in the range of 160-240 degrees Fahrenheit (71-116 degrees Celsius) for efficient oxygen diffusion through the hollow fibers 42. ASMs 14 operating in low-temperature environments can lose heat to the environment thereby reducing the efficiency of oxygen separation. To reduce heat loss, insulating element 38 can be provided inside of ASM 14 to effectively retain heat within ASM 14 and air separation element 36.

In the embodiment shown in FIG. 2, insulating element 38 is contained within walls of housing 28, such that insulating element 38 is positioned inward of an outer perimeter of housing 28 and substantially surrounds air separation element 36 along a length of air separation element 36, that is, insulating element 38 surrounds air separation element 36 with the exception for an opening at outlet 30. Housing 28 can have outer wall 50 and inner wall 52. Outer wall 50 can be separated from inner wall 52, forming a cavity therebetween. Insulating element 38 can be an insulating material, such as fiberglass or other suitable insulator, positioned in the cavity between walls 50 and 52. In the illustrated embodiment, insulating element 38 entirely fills the cavity. Outlet 30 can extend through walls 50, 52 to open to collection chamber 48. It will be understood by one skilled in the art, that a thickness of insulating element 38 a distance between walls 50, 52 can be varied to accommodate varying applications or as needed to sufficiently reduce heat loss from ASM 14.

Figure 3:
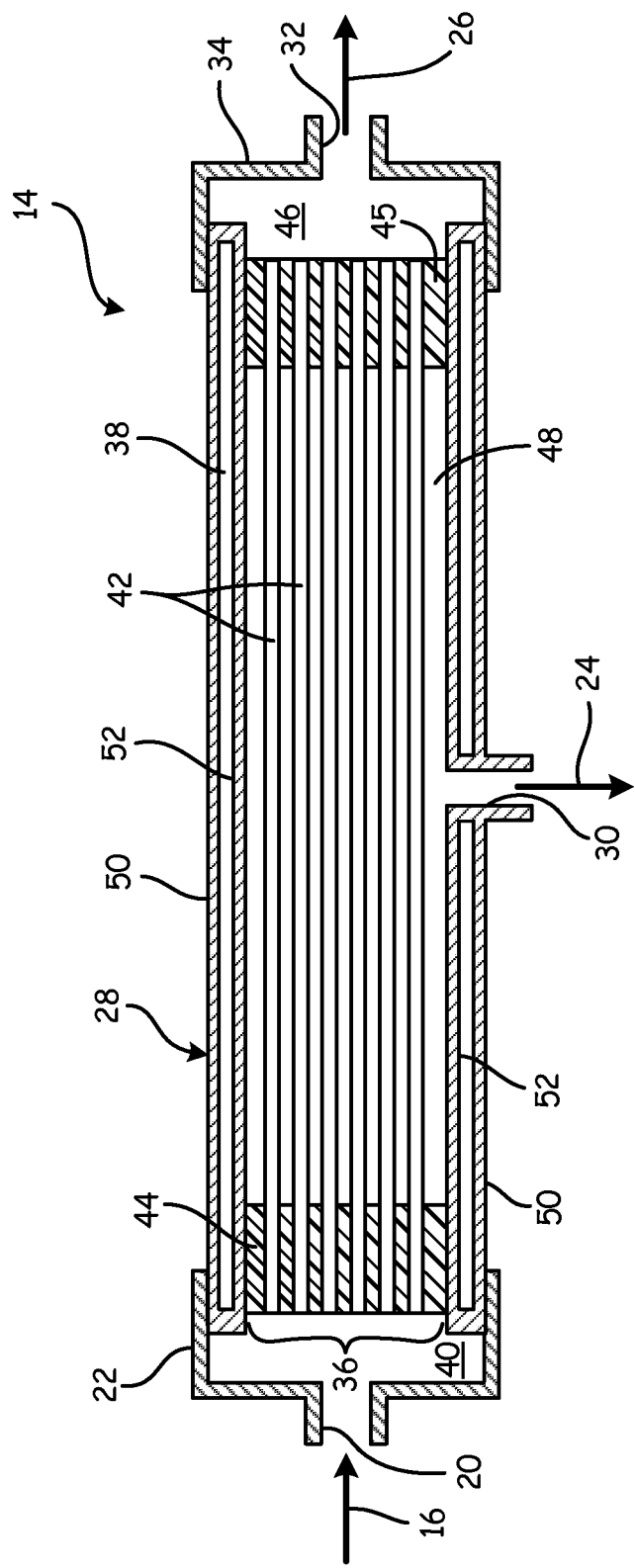
FIG. 3 is a lengthwise cross-sectional view of another embodiment of the air separation module taken along the 2-2 line of FIG. 1.

FIG. 3 shows an alternative embodiment of FIG. 2 in which insulating member 38 can be a vacuum space or an insulating fluid enclosed by walls 50, 52. The insulating fluid can include, but is not limited to an insulating gas, such as argon or krypton, another inert gas or air, or a liquid. Again, it will be understood by one skilled in the art, that the distance between walls 50, 52 can be varied to accommodate varying applications or as needed to sufficiently reduce heat loss from ASM 14.

Figure 4:
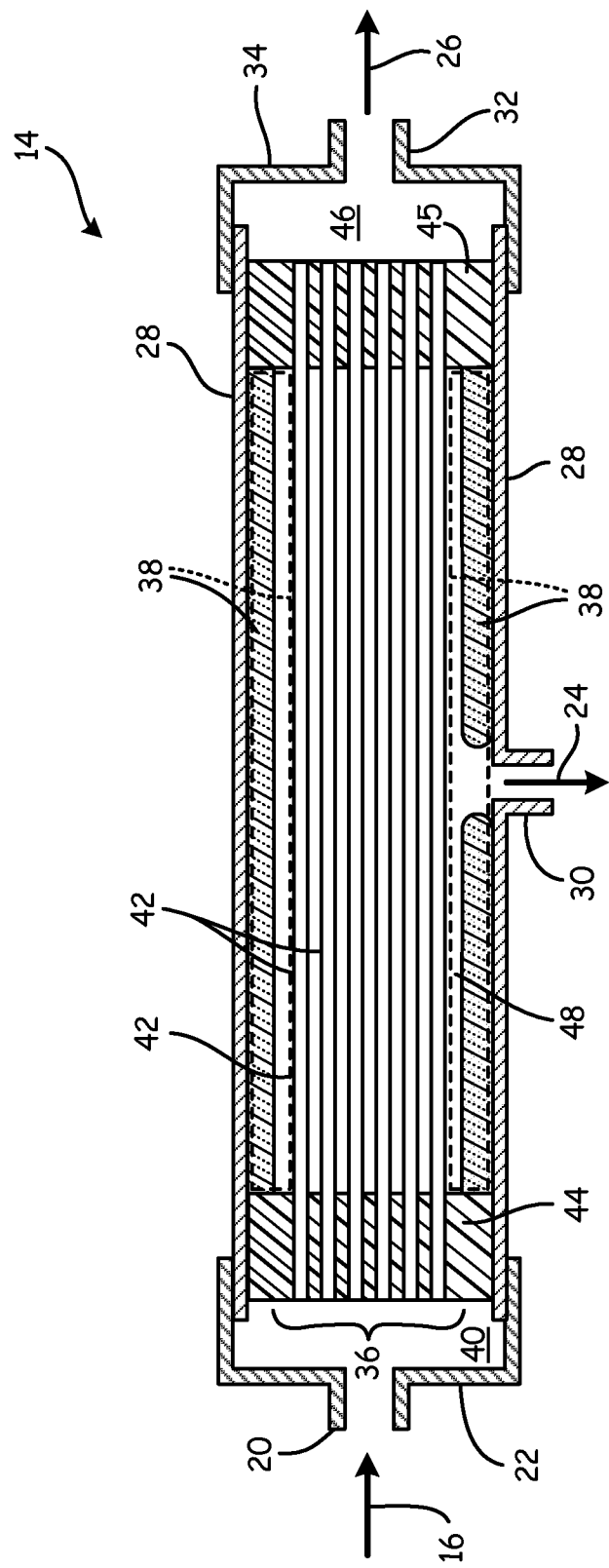
FIG. 4 is a lengthwise cross-sectional view of yet another embodiment of the air separation module taken along the 2-2 line of FIG. 1.

FIG. 4 is a lengthwise cross-sectional view of yet another embodiment of the air separation module taken along the 2-2 line of FIG. 1. The embodiment shown in FIG. 4 is similar to the embodiments shown in FIGS. 2, 3, with the exception that housing 28 has a single wall and insulating element 38 is positioned along an inner perimeter of housing 28. Insulating element 38 can be an insulating material, such as, but not limited to fiberglass. Insulating element 38 can be positioned along an inner perimeter of housing 28, such that housing 28 encloses the combination of insulating element 38 and air separation element 36. Insulating element 38 can substantially surround the outer perimeter of air separation element 36. Insulating element 38 can be positioned between and abutting binder elements 44, 45, such that insulating element 38 does not extend along a full length of air separation element 38. Insulating element 38 can be separated from air separation element 36 by collection chamber 48. A hole through insulating element 38 can allow direct fluid communication between outlet 30 and collection chamber 48.

In yet another embodiment, insulating element 38 can wrap around air separation element 36, such that insulating element 38 is in contact with at least a portion of each of air separation element 36 and the inner perimeter of housing 28 (shown in phantom in FIG. 4). Again, insulating element 38 can be positioned between and abutting binder elements 44, 45, such that insulating element 38 does not extend along the full length of air separation element 38. In this embodiment, insulating element 38 can include an insulating material capable of accommodating the flow of oxygen-enriched air stream 24 from hollow fibers 42 to outlet 30. It will be understood by one skilled in the art, that the thickness of insulating element 38 and the material comprising insulating element 38 shown in the embodiments of FIG. 4 can be varied to accommodate varying applications or as needed to sufficiently reduce heat loss from ASM 14 or permit the flow of oxygen-enriched air stream 24 from air separation element 36 to outlet 30.

Discussion of Possible Embodiments

The following are non-exclusive descriptions of possible embodiments of the present invention.

In one aspect, an air separation module includes a housing, an air separation element, and an insulating element. The housing has an inlet and two outlets. The air separation element is enclosed within the housing and extends along a length of the housing. The insulating element is positioned inward of an outer perimeter of the housing and substantially surrounds an outer perimeter of the air separation element along a length of the air separation element.

The air separation module of the preceding paragraph can optionally include, additionally and/or alternatively, any one or more of the following features, configurations and/or additional components:

The housing can further include a first wall and a second wall each extending a length of the housing, wherein the first wall is positioned outward of the second wall.

The housing can further comprise a vacuum space between the first and second wall, wherein the vacuum space forms the insulating element.

The insulating element can comprise an insulating medium positioned between the first and second wall.

The air separation element can include a plurality of semi-permeable fibers configured to release oxygen-enriched air along a length of the air separation element.

The first outlet can be located at a position along the length of the housing and can extend through the housing.

The air separation module can further include a fluid collection chamber positioned between the air separation element and the housing, wherein the first outlet is in fluid communication with the fluid collection chamber.

The air separation module can further include a fluid collection chamber positioned at an end of the air separation element opposite the inlet and the second outlet can be in fluid communication with the fluid collection chamber.

In another aspect, an air separation module includes an air separation element, an insulating element, and a housing. The insulating element substantially surrounds an outer perimeter of the air separation element along a length of the air separation element. The housing has an inlet, a first outlet, and a second outlet, and encloses the combination of the insulating element and the air separation element.

The air separation module of the preceding paragraph can optionally include, additionally and/or alternatively, any one or more of the following features, configurations and/or additional components:

The air separation element can further include a plurality of semi-permeable fibers configured to release oxygen-enriched air along the length of the air separation element.

The insulating element can be positioned in contact with at least a portion of each of an inner wall of the housing and the outer perimeter of the air separation element.

The air separation module can further include a fluid collection chamber positioned between the insulating element and the air separation element.

The insulating element can include a hole, which fluidly connects the first outlet to the fluid collection chamber.

The first outlet can be located at a position along a length of the housing and can extend through the housing.

The second outlet can be located at an end of the air separation element opposite the inlet.

The air separation can further include a seal between the air separation element and the housing configured to prevent an air flow from bypassing the air separation element.

The housing can further include a first end having the inlet and a second end having the second outlet, wherein at least one of the first and second ends are detachable and wherein the air separation element is separable from the air separation module and can be removed from the housing through at least one of the first and second ends and replaced with another air separation element.

In yet another aspect, a method of making an air separation module to improve efficiency of separation includes the steps of fabricating a housing for an air separation module, providing an insulating element extending substantially along a length of the housing and enclosed within an outer perimeter of the housing, and positioning an air separation element within the housing. The air separation element extends substantially along the length of the housing.

The step of fabricating the housing can include forming a first and second wall each extending along the length of the housing, wherein the first wall can be positioned outward of the second wall.

The step of providing an insulating element can include placing an insulating material and/or an insulating fluid between the first and second wall.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air separation module comprising:
   a housing comprising:
      an inlet; and
      a first and second outlet;
   an air separation element enclosed within the housing and extending along a length of the housing, wherein the air separation element comprises a plurality of semi-permeable fibers configured to release oxygen-enriched air along a length of the air separation element; and
   an insulating element inward of an outer perimeter of the housing and substantially surrounding an outer perimeter of the air separation element along the length of the air separation element.

2. The air separation module of claim 1, wherein the housing further comprises:
   a first wall and a second wall each extending along the length of the housing, wherein the first wall is positioned outward of the second wall.

3. The air separation module of claim 2, wherein the housing further comprises a vacuum space between the first and second wall, and wherein the vacuum space forms the insulating element.

4. The air separation module of claim 2, wherein the insulating element comprises an insulating medium positioned between the first and second wall.

5. The air separation module of claim 1, wherein the first outlet is located at a position along the length of the housing and extends through the housing.

6. The air separation module of claim 1, further comprising:
   a fluid collection chamber positioned between the air separation element and the housing, and wherein the first outlet is in fluid communication with the fluid collection chamber.

7. The air separation module of claim 1, further comprising a fluid collection chamber positioned at an end of the air separation element opposite the inlet, and wherein the second outlet is in fluid communication with the fluid collection chamber.

8. The air separation module of claim 1, wherein the insulating element is wrapped around the air separation element, such that the insulating element is in contact with at least a portion of each of an inner wall of the housing and the outer perimeter of the air separation element.

9. An air separation module comprising:
an air separation element, wherein the air separation element comprises a plurality of semi-permeable fibers configured to release oxygen-enriched air along a length of the air separation element;
an insulating element substantially surrounding an outer perimeter of the air separation element along the length of the air separation element; and
a housing having an inlet, a first outlet, and a second outlet, wherein the housing encloses the combination of the insulating element and the air separation element.

10. The air separation module of claim 9, wherein the insulating element is positioned in contact with at least a portion of each of an inner wall of the housing and the outer perimeter of the air separation element.

11. The air separation module of claim 9, further comprising:
a fluid collection chamber positioned between the insulating element and the air separation element.

12. The air separation module of claim 11, wherein a hole through the insulating element fluidly connects the first outlet to the fluid collection chamber.

13. The air separation module of claim 9, wherein the first outlet is located at a position along a length of the housing and extends through the housing.

14. The air separation module of claim 9, wherein the second outlet is located at an end of the air separation element opposite the inlet.

15. The air separation module of claim 9, further comprising a seal between the air separation element and the housing configured to prevent an air flow from bypassing the air separation element.

16. The air separation module of claim 9, wherein the housing further comprises:
a first end having the inlet; and
a second end having the second outlet, wherein at least one of the first and second ends are detachable and wherein the air separation element is separable from the air separation module and can be removed from the housing through at least one of the first and second ends and replaced with another air separation element.

17. A method of making an air separation module to improve efficiency of separation, the method comprising the steps of:
fabricating a housing for an air separation module, wherein the housing comprises an inlet, a first outlet, and a second outlet;
positioning an air separation element within the housing, wherein the air separation element extends substantially along a length of the housing, and wherein the air separation element comprises a plurality of semi-permeable fibers configured to release oxygen-enriched air along the length of the air separation element; and
providing an insulating element inward of an outer perimeter of the housing and substantially surrounding an outer perimeter of the air separation element along the length of air separation element.

18. The method of claim 17, wherein fabricating the housing comprises forming a first and second wall each extending along the length of the housing and wherein the first wall is positioned outward of the second wall.

19. The method of claim 18, wherein providing an insulating element comprises placing an insulating medium between the first and second wall.

20. The method of claim 18, wherein the insulating element comprises a vacuum space formed between the first and second wall.

* * * * *